United States Patent [19]

Guo et al.

[11] Patent Number: 5,538,710
[45] Date of Patent: Jul. 23, 1996

[54] SYNTHESIS OF MESOPOROUS CATALYTIC MATERIALS

[75] Inventors: Chang-Jiey Guo, Edmonton; Craig W. Fairbridge, Calmar; Jean-Pierre Charland, Hull, all of Canada

[73] Assignee: Energy Mines and Resources-Canada, Ottawa, Canada

[21] Appl. No.: 355,899

[22] Filed: Dec. 14, 1994

[51] Int. Cl.$^6$ .................................. C01B 37/00
[52] U.S. Cl. ................ 423/701; 423/705; 423/713; 502/60
[58] Field of Search ............... 423/701, 704, 423/705, 716, 713; 502/60

[56] References Cited

U.S. PATENT DOCUMENTS

| | | | |
|---|---|---|---|
| 4,205,053 | 5/1980 | Rollmann et al. | 423/705 |
| 5,057,296 | 10/1991 | Beck | 423/277 |
| 5,069,890 | 12/1991 | Dai et al. | 423/716 |
| 5,102,643 | 4/1992 | Kresge et al. | 423/702 |
| 5,108,725 | 4/1992 | Beck et al. | 423/705 |
| 5,213,786 | 5/1993 | Beck et al. | 423/705 |
| 5,215,737 | 6/1993 | Chu et al. | 423/706 |
| 5,246,689 | 9/1993 | Beck et al. | 423/705 |
| 5,250,282 | 10/1993 | Kresge et al. | 423/705 |
| 5,304,363 | 4/1994 | Beck et al. | 423/705 |
| 5,308,602 | 5/1994 | Calabro et al. | 423/705 |
| 5,334,368 | 8/1994 | Beck et al. | 423/705 |

OTHER PUBLICATIONS

Beck, J. S. et al, "A New Family of Mesoporous Molecular Sieves Prepared with Liquid Crystal Templates" J. Am. Soc. 1992 114,10834–10843. No month.

*Primary Examiner*—Mark L. Bell
*Assistant Examiner*—David Sample

[57] ABSTRACT

A novel siliceous molecular sieve material is described for use as catalyst, along with a process for its production. The sieve material is unique in having a bimodal pore size distribution with micropores having diameters in the range from 5 to 12 Å and uniformly sized mesopores having diameters in the range from 20 to 80 Å. It is prepared by first preparing two reaction solutions, the first solution containing a source of silica and the second solution containing a quaternary ammonium surfactant having a hydrophilic ammonium group and a linear hydrophobic hydrocarbon chain. The two solutions are combined and the solid product obtained at room temperature is subjected to a two-stage heat treatment.

10 Claims, 8 Drawing Sheets

X-AXIS SCALE UNIT......ANGSTOMS x 10E3
Y-AXIS SCALE UNIT......cc/g x 10E3

SYNTHESIS OF MESOPOROUS CATALYTIC MATERIALS

BACKGROUND OF THE INVENTION

This invention relates to the synthesis of mesoporous catalytic materials, generally known as molecular sieves.

Porous inorganic solids with molecular sieving properties, such as zeoiites, have been extensively used as heterogeneous catalysts and absorbants. This is because these materials have very large internal surface area, good thermal stability and, most importantly for catalytic applications, shape-selective and acidic properties. In many applications, particularly in the petroleum and petrochemical industries, molecular sieve zeolites totally dominate many established and most new processing technologies. However, most commercial zeolites are microporous with channel or cavity dimensions in the range of 5 to 14 Å. This limits their application in processes dealing with larger molecules. Considerable effort has been devoted to develop a framework with pore diameters greater than 10 Å. Recently, Mobil Oil Corporation has developed a family of mesoporous molecular sieve materials designated as M41S. This is a crystalline molecular sieve material with large pore diameters in the range of 15 to 100 Å. The synthesis methods that are used are similar to those used in traditional zeolite synthesis except that large quaternary ammonium surfactant components were used. These new mesoporous products are typically prepared at temperatures in the range of 90° to 150° C. The production of such mesoporous catalysts is described, for instance, in Kresge et al U.S. Pat. No. 5,250,282, issued Oct. 5, 1993, Beck et al U.S. Pat. No. 5,108,725, issued Apr. 28, 1992 and Beck U.S. Pat. No. 5,057,296, issued Oct. 15, 1991.

It is believed that, like many thousand organic substances with an elongated, narrow molecular framework, the large organic ammonium surfactant molecules form a liquid crystal phase in its aqueous solution. Cationic surfactants are composed of groups of opposing solubility tendencies, typically an oil-soluble hydrocarbon chain and a water-soluble ionic group. Typically, the cationic surfactants have a hydrophilic head group, e.g. an ammonium group, with a positive charge and a long hydrophobic hydrocarbon chain or tail group. It is the hydrophilic portion of the molecule that enables the surfactant molecules to be miscible with water. However, at a given condition, the critical micelle concentration or "CMC" is relatively small. Therefore, as the concentration of the surfactant exceeds its CMC, the surfactant molecules tend to form miceiles. A minimum energy results when the surfactant molecules arrange themselves in such a way that there is a minimum contact between their hydrocarbon tails and surrounding water molecules. Thus, for cationic surfactants in water, micelles of different shapes may be formed. The hydrophilic heads of the surfactant molecules contact surrounding water molecules and the hydrocarbon chains or tails are hidden inside. Thus, as the surfactant concentration in the acueous solution exceeds its CMC, the cationic surfactant molecules form a liquid crystal phase. Such liquid crystal phase serves as a template as well as a catalyst for the formation of a regular aluminosilicate structure. When an as-synthesized product is calcined at high temperature, the surfactant molecules are decomposed and escape from the crystalline structure, creating the desired highly porous silica alumina molecular sieve framework.

Liquid crystals are materials which exhibit aspects of both the crystalline solid and the amorphous liquid state. They resemble liquids in their ability to flow, and solids in the degree of order within their structure. In many systems, this order is established spontaneously. In other cases, it can be brought about, or controlled, by electric, magnetic or hydrodynamic fields.

It is a primary object of the present invention to provide an improved process for producing mesoporous catalytic materials.

SUMMARY OF THE INVENTION

According to the present invention, it has surprisingly been discovered that it is possible to make mesoporous catalytic materials at room temperature with very short preparation times, provided that an appropriate thermal treatment is performed.

Thus, the process of the present invention is for synthesizing a mesoporous molecular sieve material comprising an inorganic, porous material having, after calcination, an arrangement of uniformly-sized mesopores having diameters of at least about 20 Å, preferably 20 to 80 Å, more preferably 30 to 40 Å, an internal area greater than 200 $m^2/g$ and preferably greater than 800 $m^2/g$ and a thermal stability of up to 800° C. The steps of the process comprise beginning by preparing two reaction solutions. The first solution contains a source of silica, while the second solution contains a quaternary ammonium surfactant having a hydrophilic ammonium group and a linear hydrophobic hydrocarbon chain. The two solutions are combined and mixing is carried out at a pH in the range of 8 to 13. The mixing is then stopped and the product is allowed to form. Thereafter the solid product is separated and is subjected to a two stage heat treatment including calcinization. The two stage heat treatment includes a first stage in which the temperature of the crystallized product is slowly increased, e.g. at a rate of about 2° to 4° C. per minute, from room temperature to a temperature of about 100° to 150° C., preferably about 110° to 130° C., and the product is held at this temperature for a time of about 0.5 to 24 hours, preferably about 1 to 10 hours. The temperature of the product is then again raised steadily, e.g at a rate of about 4° to 6° C. per minute, up to a calcining temperature of about 300° to 600° C., preferably about 500° to 600° C., and is held at that temperature for a period of about 2 to 24 hours, preferably about 1 to 10 hours.

It has also been found through careful $N_2$ and Ar adsorption measurements of the products of this invention that there exist actually two types of pores with different pore openings. Thus, in addition to the uniformly-sized mesopores of diameters of at least 20 Å stated above, the products also contain micropores having diameters in the range of about 5 to 12 Å, preferably about 6 to 8 Å. Accordingly, the products of this invention are not typical molecular sieves in the conventional sense. This bimodal pore size distribution of the present invention is potentially important for petroleum processing reactions, particularly hydrocracking. This is because the mesopores can be accessed easily by the heavy molecules, and these large molecules could be cracked to a certain extent in the mesopores. The cracked smaller molecules can then diffuse into and react in the micropores. Since the micropores have a diameter very close to that of zeolite Y, the molecules emerging from their micropores are typically in the gasoline range, as a result of shape-selective effect.

The ammonium ion of the surfactant is preferably of the formula:

wherein at least one of $R_1$, $R_2$, $R_3$ and $R_4$ is aryl or alkyl of from 6 to about 36 carbon atoms, especially from 8 to 36 carbon atoms, e. g. —$C_{10}H_{21}$, —$C_{16}H_{33}$ and —$C_{18}H_{37}$, or combinations thereof, the remainder of $R_1$, $R_2$, $R_3$ and $R_4$ being selected from the group consisting of hydrogen, alkyl of from 1 to 5 carbon atoms and combinations thereof. The compound from which the above ammonium ion is derived may be, for example, the hydroxide, halide, silicate, or mixtures thereof.

Among suitable ammonium groups within the above definition there may be mentioned cetyltrimethylammonium, cetyltrimethylphosphonium, octadecyltrimethylphosphonium, cetylpyridinium, myristyltrimethylammonium, decyltrimethylammonium dodecyltrimethylammonium and dimethyldidodecylammonium.

Preferably, the second solution contains also an alumina source. Although this alumina is not essential to the preparation of the solid structure, the alumina incorporated makes the solid much more useful as a catalytic material because of the ion exchange capacity and specific surface site introduced by the alumina. The alumina is typically in the form of aluminum sulphate or sodium aluminate.

It is also possible to add various additional transition metal components to the product and this is preferably done by adding metal salts of transition metals to the second solution. A variety of these may be used including iron sulphate, cobaltous sulphate, cupric sulphate, magnesium sulphate, titanium sulphate, nickel nitrate, ammonium paramolybdate, etc.

Experimental results show that everything else being the same, no mesoporous molecular sieve phase is formed under the following conditions:

1) no surfactant components are added.
2) the surfactant is replaced by a long chain hydrocarbon (i.e., hexanedecane).
3) the linear surfactant is replaced by a non-linear surfactant, bis(hydrogenated tallow alkyl) dimethyl quaternary ammonium chloride.
4) the surfactant is added after silica sources and aluminum sources have mixed.

These results indicate that 1) the critical role played by the linear surfactant molecules is not purely a result of their geometric shape but their ability to form liquid crystal in aqueous solution; 2) a non-linear surfactant usually loses liquid crystal-forming capability and therefore is unable to play the role of templating and catalyzing aluminosilicate formation; and 3) the surfactant molecules are required to be in the mixture before any molecular sieve precursor formation occurs.

Since the orientational association of the surfactant molecules is only partial and, as the nature of intermolecular forces is delicate, liquid crystals are extraordinarily sensitive to external perturbation, e.g. electric or magnetic fields, temperature and pressure. This has been supported by experimental observations. For instance, when only a small amount of additional cations such as $F^-$ and $NH_4^+$ were introduced to the system through adding $NH_4F$, no crystal phase can be detected in the final product. It is likely that $F^-$ or $NH_4^+$ affected the electric valance in the reaction system and no liquid crystal phase can be formed although $F^-$ ion has long been considered a crystal stabilizing species in the synthesis of many microporous zeolites. However, to some other species, the liquid crystal phase show little sensitivity. This makes the substitution of aluminum by other metals through the addition of different metal components possible and successful.

A distinctive feature of the process of this invention is that mesoporous structures are formed at standard conditions of temperature and pressure, i.e. about 20° C. at a pressure of one atmosphere. However, the process can be carried out at temperatures generally in the range of about 0° to 25° C. Under these conditions, the time for the mesoporous precursor phase to form can be as little as several minutes, and generally within a time of about 5 minutes to about 4 hours. Such phenomenon has not previously been noted. This suggests that the forming process of this invention is not the same as that of traditional zeolite synthesis for which an induction period, a nucleation step and a silica condensation step are presumed to be the necessary steps. In this mesoporous solid preparation process using linear surfactants, the energy requirement for the formation of a mesoporous structure is substantially reduced. It appears to be more akin to a chemical reaction than to a slow crystallization process. It is believed that this may be the result of the presence of electric charges at the liquid crystals and water interfaces. Thus, it is believed that the ionic silicate and aluminate species present in the solution may rapidly approach these interfaces to balance the electric charges and at the same time form inorganic walls ground the micelies. As indicated above, poor mesoporous solid phase is formed if the surfactant component is added to the system after silica and aluminum sources have mixed. This is probably because certain inorganic polymerization occurs when silica and alumina meet, losing their ability to move freely in the mixture.

This phenomenon opens a wide range of possibilities to create new inorganic structures because thousands of organic molecules have the property of forming liquid crystals under suitable conditions. By changing solvent type, solvent concentration and electric field in a surfactant-solvent-silicate system, it is possible to create liquid crystals of different shapes and sizes, creating the necessary templates and condition for the formation of different inorganic structures.

It is known that liquid crystal phases are capable of solubilization of organic molecules with the hydrophilic interiors. Based on this, different organic molecules, typically mesitylene, have been used by previous researchers to enlarge the pore size of molecular sieves. However, at room temperature, these small organic molecules lose their ability to increase the pore size of molecular sieve materials. On the other hand, it has been found that decalin as an auxiliary component is successful in increasing the molecular sieve pore size.

The thermal treatment of the product is essential to the production of high surface areas, mesoporous molecular sieve material. The preferred thermal treatment is to first raise the temperature of the product at a rate of about 3° C. per minute from room temperature to about 120° C., and hold the temperature for about 2 to 5 hours. The temperature is then again raised at a rate of about 5° C. per hour to about 540° C. and held at that temperature for about 2 to 5 hours. The calcined product exhibits a major XRD peak at 1.5 to 2.5 degrees 2-theta, a surface area greater than 800 m²/g, a pore volume greater than 0.6 cm³/g and thermal stability up to 800° C. When heated to 900° C. in air, the mesoporous structures of the samples collapsed as indicated by the absence of XRD peaks.

The products of this invention are believed to be somewhat less than true crystalline material and are believed to fall somewhere between conventional definitions of amorphous and crystalline solids.

BRIEF DESCRIPTION OF THE DRAWINGS

In the drawings which illustrate certain preferred embodiments of this invention.

DESCRIPTION OF THE PREFERRED EMBODIMENTS

Certain preferred embodiments of this invention are illustrated by the following non-limiting examples.

The surface area, pore size and pore size distribution were measured using a Quantachrome Autosorb I $N_2$ adsorption instrument. The crystallite phase identification of the solid products was conducted on a SIEMENS DIFFRAL 500 diffractometer with theta-theta geometry and Cu-alpha radiation.

EXAMPLE 1

Two solutions were prepared as follows:

Solution 1: 56.6 grams of sodium silicate solution was mixed with 80 grams of water. 2.4 grams of sulfuric acid was then added with stirring.

Solution 2: 5.2 grams of aluminum sulfate was dissolved in 208 grams of water. 35.8 grams of cetyltrimethyl ammonium bromide (CTMABr) was then added with stirring.

Figure 1:
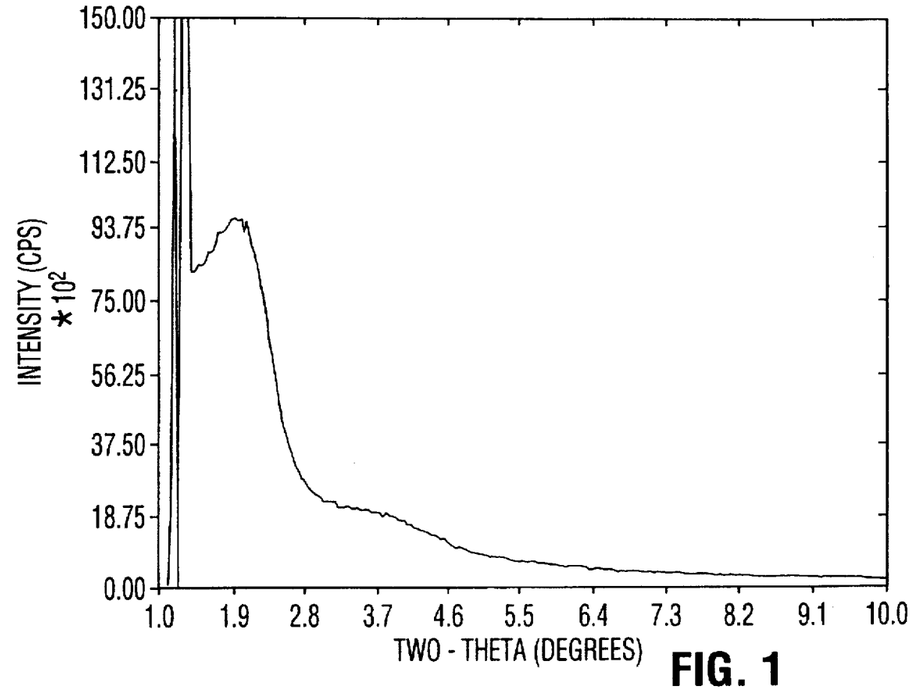
FIGS. 1, 3, 5, 7, 8, 10, 12 and 14 are X-ray diffraction patterns of products of Examples 1, 3, 4, 5, 6, 7, 8 and 9, respectively, hereinafter preferred.
Figure 2:
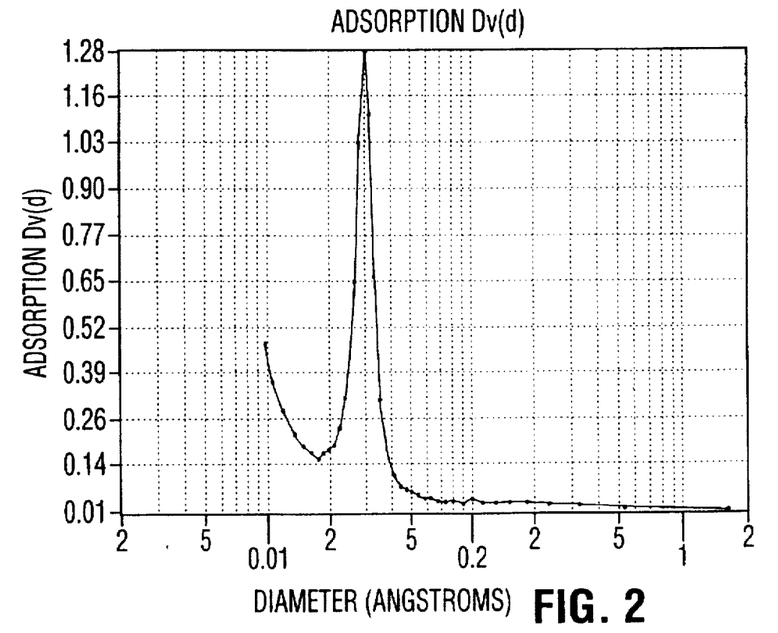
FIGS. 2, 4, 6, 9, 13 and 15 are pore size distributions obtained by $N_2$ adsorption for products of Examples 1, 3, 4, 6 and 8, respectively.

As both solutions are homogeneous, Solution 2 was added to Solution 1 with vigorous stirring for 3 minutes. 46 grams of water was then added. After another 5 minutes of stirring, the mixture was placed in a sealed glass bottle at room temperature for 5 hours. A solid product was recovered by filtration using a Buchner funnel, washed with water, and dried in air at room temperature. The as-synthesized product was dried at 120° C. for 4 hours and then calcined at 540° C. for 1 hour in flowing $N_2$/air and 5 hours in air. The X-ray diffraction pattern as shown in FIG. 1 exhibited a high intensity peak having a d-spacing of 46 Å at 2 degrees 2-theta. The pore size distribution obtained by $N_2$ adsorption had a range of 25 to 35 Å as shown in FIG. 2. The solid product had a BET surface area of 884 $m^2/g$.

EXAMPLE 2

Several runs similar to Example 1 were carried out to study the effect of $CTMA^+/SiO_2$ and $H_2O/SiO_2$ ratios on product quality. With the same Solution 1 described above, the composition of Solution 2 was changed by varying the amount of CTMABr or water added. Four different $CTMA^+/SiO_2$ ratios, 0.1, 0.2, 0.51 and 0.7, were used. Two $H_2O/SiO_2$ ratios, 41.4 and 75.8 were applied. At room temperature and four hours of reaction, all runs produced similar mesoporous solids after calcination. However, it was evident that $CTMA^+/SiO_2$ ratio of 0.51 and $H_2O/SiO_2$ ratio of 75.8 produced the best results in terms of strength of the XRD peaks.

EXAMPLE 3

Two solutions were prepared as follows:

Solution 1: 9.4 grams of sodium silicate solution was mixed with 20 grams of water. 0.6 grams of sulfuric acid was then added with stirring.

Solution 2: 8.4 grams of CTMABr was mixed with 25.2 grams of water with stirring.

Figure 3:
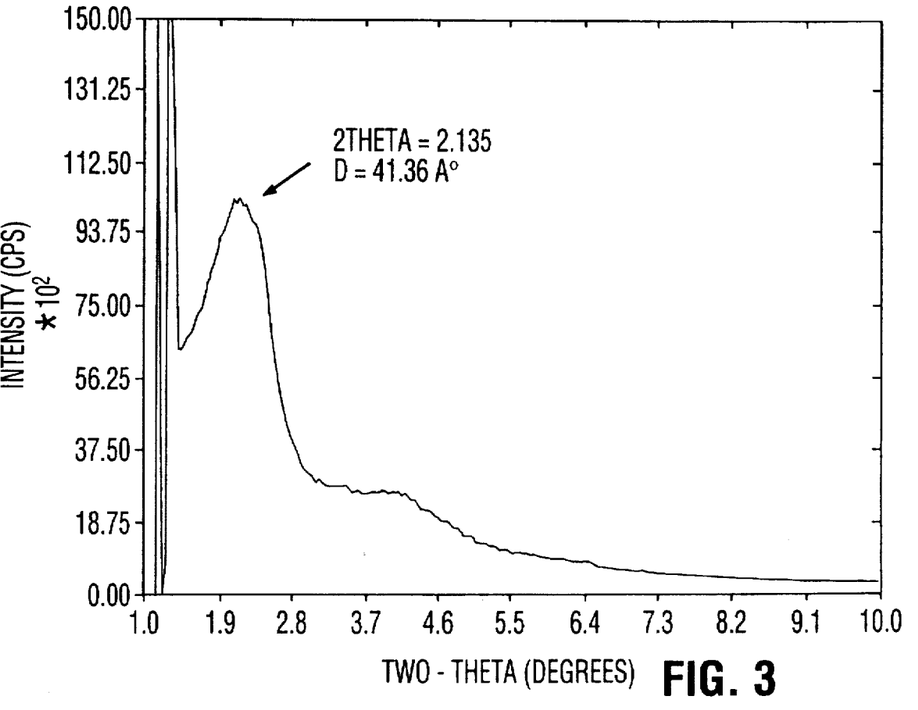
Figure 4:
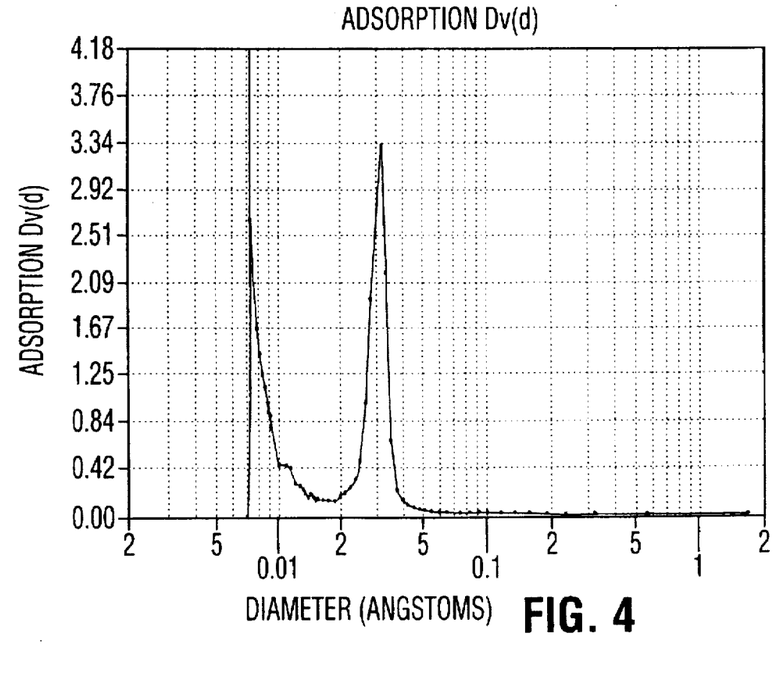

As both solutions are homogeneous, Solution 2 was added to Solution 1 with vigorous stirring for 3 minutes. 10 grams of water was then added. After another 5 minutes of stirring, the mixture was placed in a sealed glass bottle at room temperature for 10 minutes. A solid product is recovered and calcined using the procedure described in Example 1. The X-ray diffraction pattern in FIG. 3 exhibited a high intensity peak having a d-spacing of 41 Å at 2.135 degrees 2-theta. The pore size distribution obtained by $N_2$ adsorption was in the range 26 to 36 Å as shown in FIG. 4. The solid product had a BET surface area of 1100 $m^2/g$.

EXAMPLE 4

Two solutions were prepared as follows:

Solution 1: 14.5 grams of N-brand sodium silicate was mixed with 20 grams of water under stirring, 0.6 gram of sulfuric acid was then added. The mixture was stirred for 5 minutes.

Solution 2: 1.2 grams iron sulfate was added to 25.2 grams of water under stirring. After the iron sulfate was completely dissolved, 9.0 grams of CTMABr was added. The mixture was stirred for 5 minutes.

Figure 5:
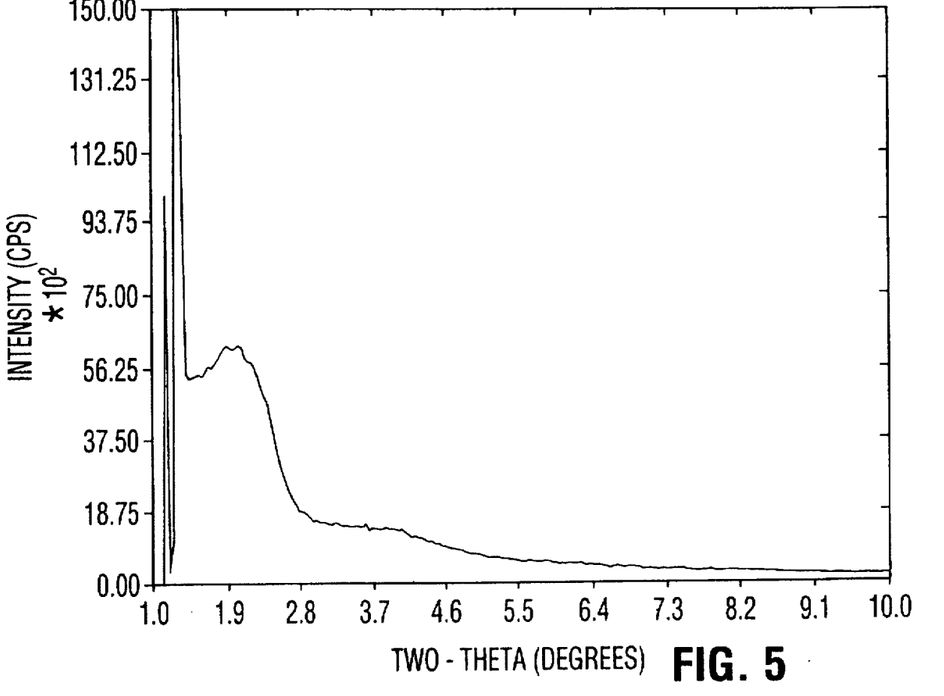
Figure 6:
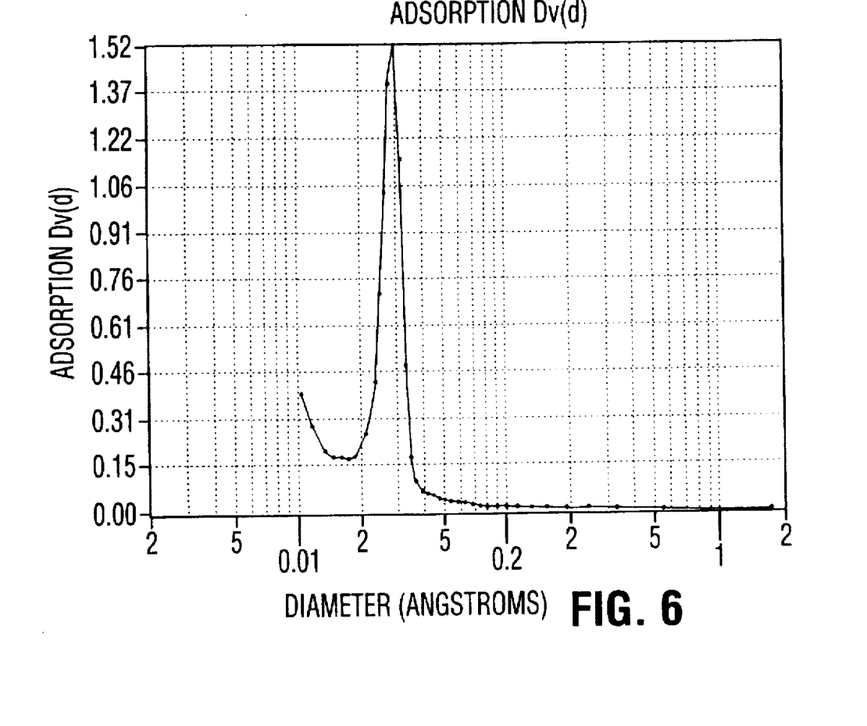

Solution 2 was mixed with Solution 1 and the resulting mixture was stirred using a glass rod for 3 minutes. 11.5 grams of water was then added with stirring. The final mixture had a pH value of about 10. The mixture was placed in a sealed glass bottle at room temperature (~20° C.) for 24 hours. A solid product was obtained using the same procedure described in Example 1. The solid product had a BET surface area of 886 $m^2/g$. The X-ray diffraction pattern of the calcined product as shown in FIG. 5 exhibited a high intensity peak having a d-spacing of 42 Å at 2.5 degrees 2-theta. Its pore distribution had a range of 22 to 32 Å as shown in FIG. 6.

EXAMPLE 5

Figure 7:
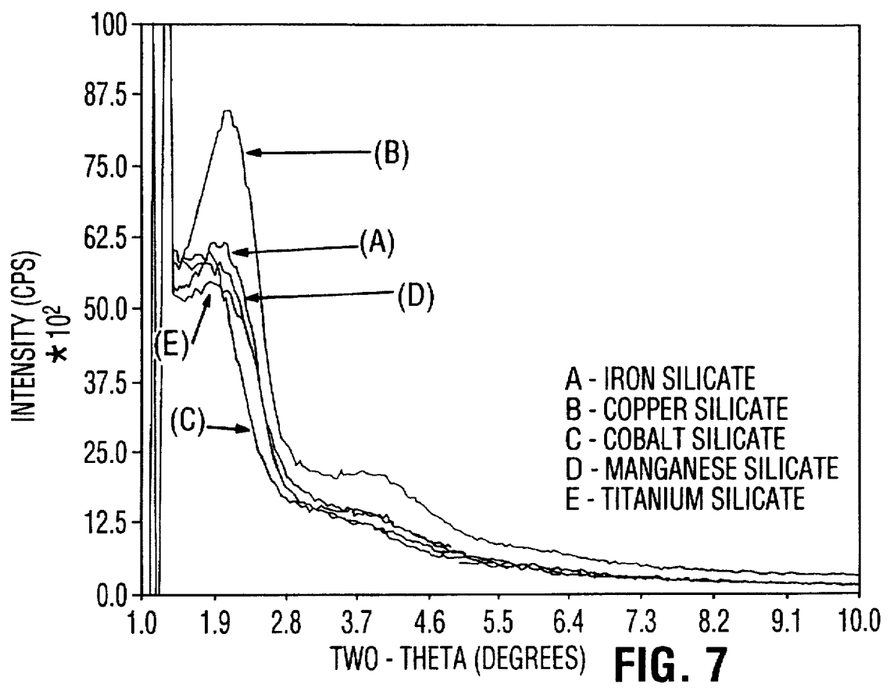

Similar to Example 4, four different runs were made to replace iron sulfate in Solution 2 of Example 4 by cobaltous sulfate (1.2 grams), cupric sulfate (1.1 grams), magnesium sulfate (0.8 gram) and titanium sulfate (1.7 grams) respectively. The resulting mixtures were placed in different glass bottles for 24 hours. The solid products were recovered and treated using the same procedure in Example 1. The XRD patterns of the products given in FIG. 7 showed high intensity peaks having d-spacings in the range of 38 to 43 Å at the range 1.5 to 2.5 degrees 2-theta,

EXAMPLE 6

Two solutions were prepared as follows:

Solution 1: 14.5 grams of sodium silicate solution was mixed with 20 grams of water, 0.6 grams of sulfuric acid was then added with stirring.

Solution 2: 1.3 grams of aluminum sulfate was dissolved in 25.2 grams of water, 9.0 grams of cetyltrimethyl ammonium bromide (CTMABr) was then added with stirring. As the solution became homogeneous, 5.2 grams of decalin liquid was added and the mixture was stirred for 5 minutes.

Figure 8:
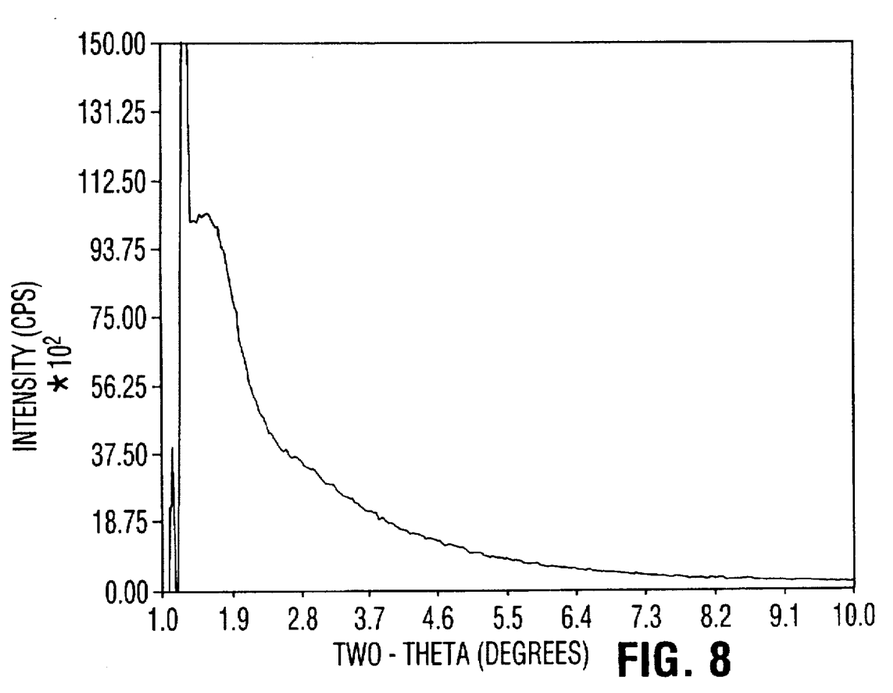
Figure 9:
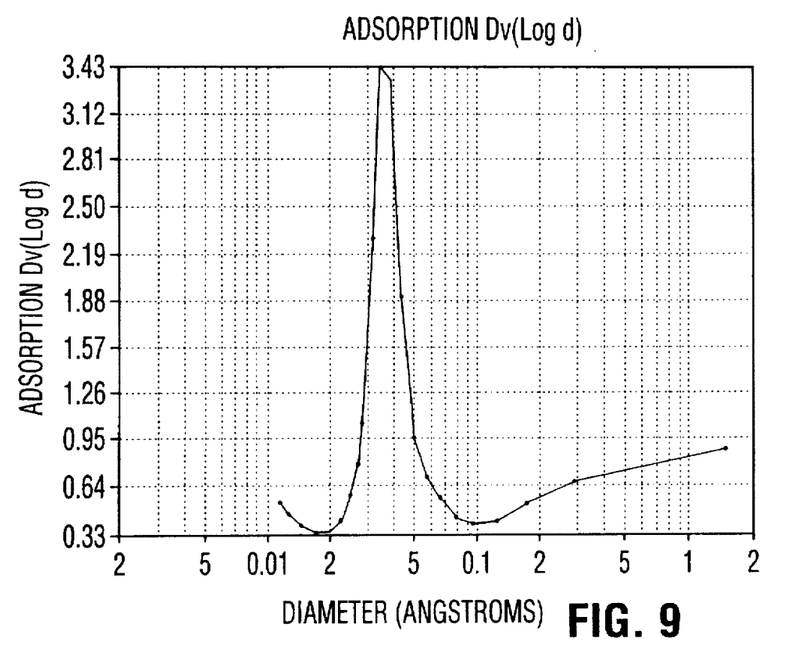

Solution 2 was added to Solution 1 with vigorous stirring for 3 minutes. 12 grams of water was then added. After another 5 minutes of stirring, the mixture was placed in a sealed glass bottle at room temperature for 1 hour. A solid product was recovered and treated using the same procedure described in Example 1. The product exhibited a d-spacing of 56 Å. BET surface area of the product was 956 $m^2/g$. The X-ray diffraction pattern shown in FIG. 8 exhibited a high intensity peak having a d-spacing of 56 Å at 1.58 degrees 2-theta. The pore size distribution obtained by $N_2$ adsorption showed a range of 25 to 60 Å in FIG. 9.

EXAMPLE 7

Two solutions were prepared as follows:

Solution 1: 14.2 grams of N-brand silica was mixed with 20 g of distilled water. 0.6 grams of sulfuric acid was added with stirring.

Solution 2: 8.94 grams of cetyltrimethyl ammonium bromide was mixed with 25.2 grams of water and 1.3 grams of aluminum sulfate with stirring.

Figure 10:
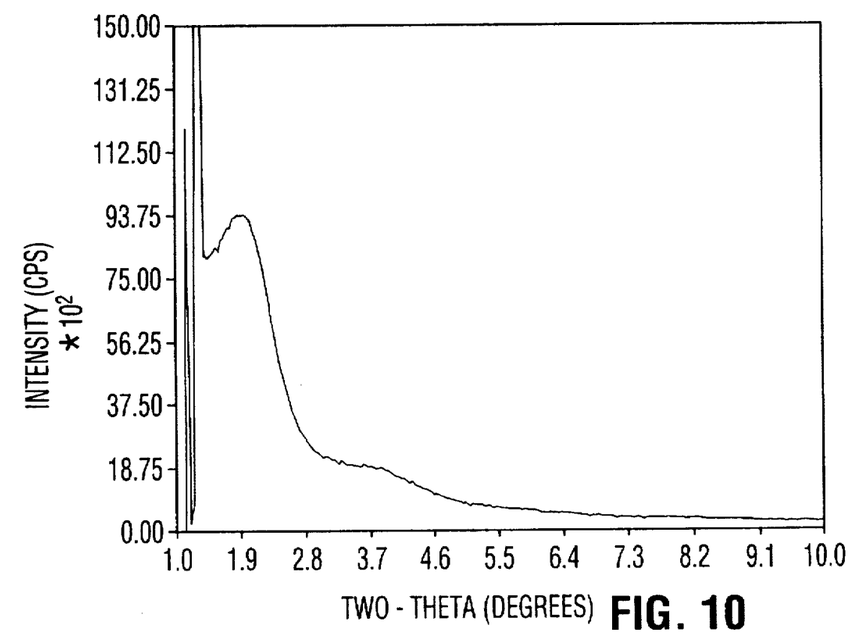
Figure 11:
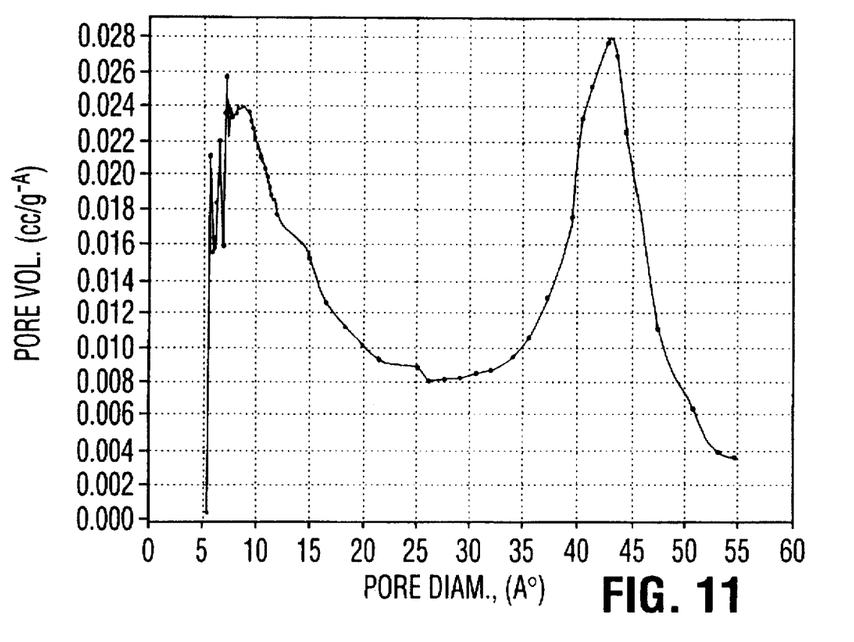
FIG. 11 is a pore size distribution obtained by Ar adsorption.

Solution 2 was added to Solution 1 with vigorous stirring and an additional 11.5 grams of water was added. After 5 minutes of stirring, the mixture was placed in a sealed glass bottle at room temperature for 48 hours. A solid product was recovered and treated using the same procedure described in Example 1. The X-ray diffraction pattern of FIG. 10 exhibited a high-intensity peak at 2.1 degrees 2-theta having a d-spacing of 41 Å. The pore volume distribution of the aluminosilicate molecular sieve material was measured by Argon adsorption and a Horvath-Kawozoe differential pore volume plot is shown in FIG. 11. This clearly illustrates two groups of pore diameter, one group having diameters of about 7 Å and a second group having diameters of about 43 Å.

EXAMPLE 8

Two solutions were prepared as follows:

Solution 1: 283 grams of sodium silicate was mixed with 400 grams of water, 12 grams of sulfuric acid was added.

Solution 2: 6 grams of sodium aluminate was dissolved in 1150 grams of water, 178 grams of cetyltrimethyl ammonium bromide (CTMABr) was added.

Both solutions were stirred until homogeneous and then the two solutions were mixed with vigorous stirring. The pH value of the mixture was 11 to 12.

The mixture was placed in a sealed glass (or HDPE) bottle at room temperature for 16 hours. A solid product was recovered by filtration using a Buchner funnel. The solid was washed with water, dried at in air at room temperature. The as-synthesized product was: then placed in a programmable furnace for thermal treatment using the following procedure:

(a) raise temperature from room temperature to 120° C. at a rate of 2°/min;
(b) hold at 120° C. for 3 hr.;
(c) raise temperature from 120° C. to 540° C. at a rate of 5°/min.;
(d) hold at 540° C. for 3 hr.

Figure 12:
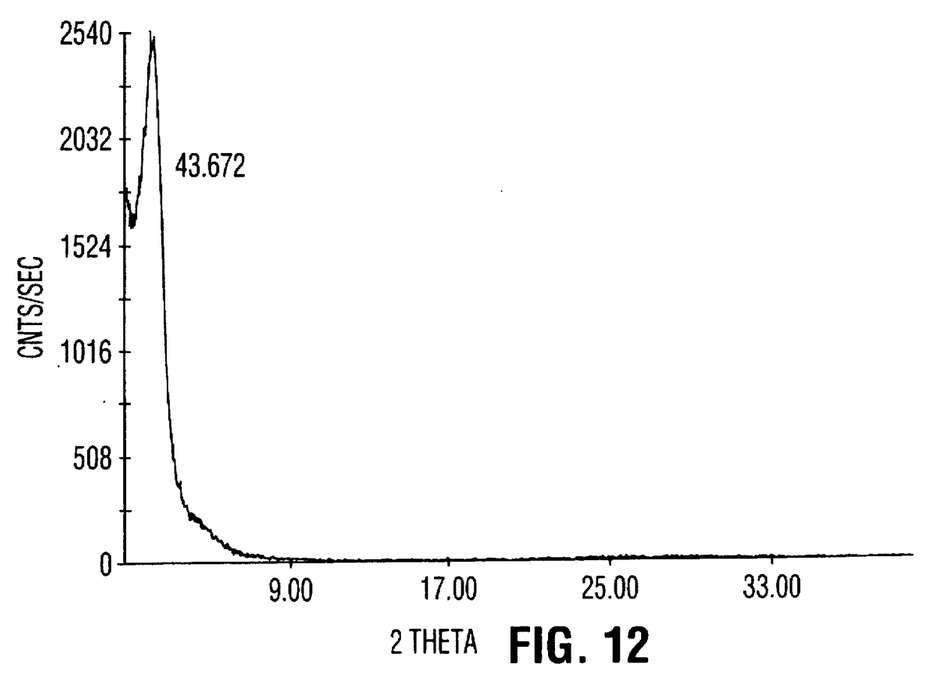
Figure 13:
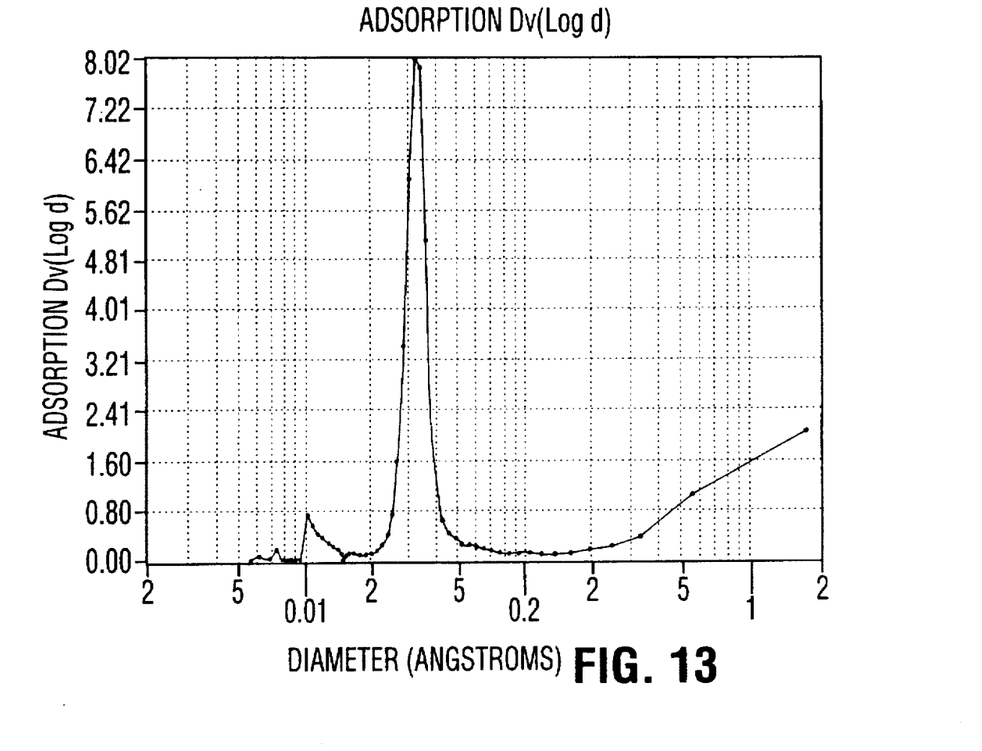

The X-ray diffraction pattern of the product as shown in FIG. 12 exhibited a high intensity peak with a d-spacing of 40 Å. The pore size distribution of the sample is given in FIG. 13. The specific surface area of the product is 1022 $m^2/g$.

EXAMPLE 9

113.2 grams of N-brand sodium silicate is mixed with 160 grams of water and 4.8 grams of sulfuric acid, resulting in a mixture of pH 11.5

4 grams of sodium aluminate, 4.4 grams of nickel nitrate and 7.2 grams of ammonium paramolybdate were dissolved in 464 grams of deionized water. 71.2 grams of cetyltrimethyl ammonium bromide was then added. The solution pH was 8.0.

The two solutions were mixed with vigorous stirring for 10 minutes. The pH of the final mixture was 11.0.

Figure 14:
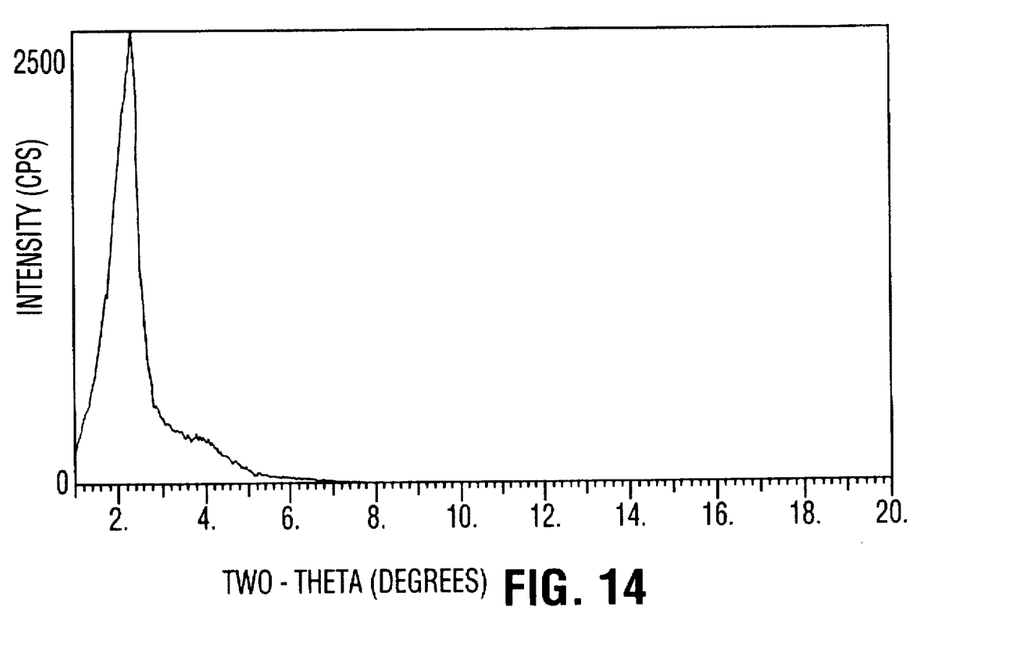
Figure 15:
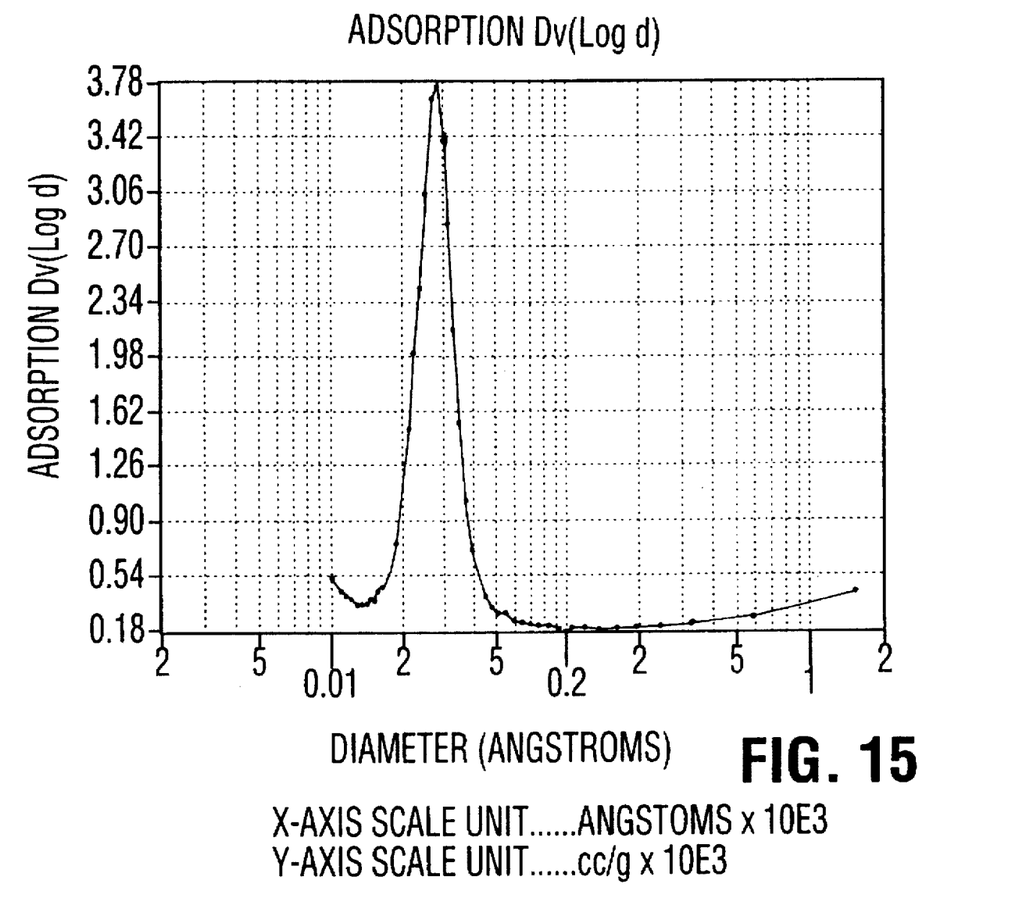

The mixture was placed in a sealed HDPE bottle at room temperature. After 20 hours, a solid product was recovered using the same procedure described in Example 1. The solid was then dried at 120° C. for 4 hours and calcined at 540° C. in air for 4 hours. The X-ray diffraction pattern of the calcined sample is shown in FIG. 14. The pore volume distribution of the material is shown in FIG. 15. The material has a surface area of 1105 $m^2/g$.

We claim:

1. A process for synthesizing a molecular sieve material comprising an inorganic porous material having, after calcination, a bimodal pore size distribution comprising an arrangement of uniformly-sized mesopores having diameters of at least about 20 Å and an arrangement of micropores having diameters in the range of about 5 to 12 Å, an internal area greater than 200 $m^2/g$ and a thermal stability up to 800° C., which comprises preparing two reaction solutions, the first solution containing a source of silica and the second solution containing a quaternary ammonium surfactant having a hydrophilic ammonium group and a linear hydrophobic hydrocarbon chain, combining the first and second solutions and mixing the combination at a pH in the range of 8 to 13, stopping the mixing and forming the mixture into a solid product with the mixing and solid product formation being carried out at a temperature in the range of 0°–25° C., separating the solid product and subjecting the product to a two-stage heat treatment comprising the steps of raising the temperature of the solid product to about 100° to 150° C., holding the product at this temperature for a time of 0.5 to 24 hours, then raising the temperature of the product to a temperature of about 300° to 600° C. and holding the product at this higher temperature for about 1 to 24 hours.

2. A process according to claim 1 wherein the molecular sieve material has an internal area greater than 800 $m^2/g$.

3. A process according to claim 2 wherein the molecular sieve material has both an arrangement of micropores having diameters in the range from 6 to 8 Å and an arrangement of uniformly sized mesopores having diameters in the range from 20 to 80 Å.

4. A process according to claim 1 wherein the second solution also contains an alumina source.

5. A process according to claim 1 wherein the second solution contains a metal salt of a metal selected from the group consisting of iron sulphate, cobaltous sulphate, cupric sulphate, magnesium sulphate and titanium sulphate.

6. A process according to claim 1 wherein the mixing and formation of the solid product is carried out within a period of about 5 minutes to 4 hours.

7. A process according to claim 6 wherein the two-stage heat treatment comprises raising the temperature of the product at a rate of about 3° C. per minute from the solid forming temperature of 0°–25° C. to about 120° C. and holding at that temperature for about 2 to 5 hours, then again raising the temperature of the product at a rate of about 5° C. per hour to about 540° C. and holding at that temperature for about 2 to 5 hours.

8. A siliceous molecular sieve material having after calcination, an arrangement of micropores having diameters in the range from 5 to 12 Å and also an arrangement of uniformly sized mesopores having diameters in the range from 20 to 80 Å, said sieve material having an internal area greater than 200 m$^2$/g and a thermal stability of up to 800° C.

9. A molecular sieve material according to claim 8 having an internal area creater than 800 m$^2$/g.

10. A molecular sieve material according to claim 9 comprising an aluminosilicate.

* * * * *